(12) United States Patent
Suzuki et al.

(10) Patent No.: US 8,523,587 B2
(45) Date of Patent: Sep. 3, 2013

(54) CONNECTOR

(75) Inventors: Sachio Suzuki, Hitachi (JP); Hideaki Takehara, Hitachi (JP); Kunihiro Fukuda, Tsukuba (JP); Yuta Kataoka, Hitachi (JP); Jun Umetsu, Hitachi (JP); Shinya Hayashi, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 13/211,071

(22) Filed: Aug. 16, 2011

(65) Prior Publication Data

US 2012/0156916 A1 Jun. 21, 2012

(30) Foreign Application Priority Data

Dec. 21, 2010 (JP) .................................. 2010-284737

(51) Int. Cl.
 *H01R 13/15* (2006.01)
(52) U.S. Cl.
 USPC ........................................................ 439/262
(58) Field of Classification Search
 USPC ................. 439/262, 284, 626, 351, 372, 346, 439/296
 See application file for complete search history.

(56) References Cited

U.S. PATENT DOCUMENTS

| | | | | |
|---|---|---|---|---|
| 2,945,201 A | * | 7/1960 | Waninger | 439/262 |
| 3,504,100 A | * | 3/1970 | Ohshima et al. | 174/88 B |
| 3,614,297 A | * | 10/1971 | Carlson | 174/88 B |
| 3,941,446 A | * | 3/1976 | Cantwell | 439/262 |
| 4,392,705 A | * | 7/1983 | Andrews et al. | 439/342 |
| 4,850,889 A | * | 7/1989 | LaSota | 439/262 |
| 7,794,247 B2 | | 9/2010 | Suzuki | |
| 7,892,038 B1 | | 2/2011 | Kataoka et al. | |
| 7,922,518 B1 | * | 4/2011 | Takehara et al. | 439/485 |
| 7,959,470 B1 | * | 6/2011 | Umetsu et al. | 439/626 |
| 8,100,708 B2 | * | 1/2012 | Kataoka et al. | 439/271 |
| 8,123,546 B2 | * | 2/2012 | Suzuki et al. | 439/372 |

(Continued)

FOREIGN PATENT DOCUMENTS

| | | |
|---|---|---|
| EP | 2 328 239 A1 | 6/2011 |
| JP | 9-82387 A | 3/1997 |
| JP | 2004-56924 A | 2/2004 |
| JP | 4037199 B2 | 1/2008 |
| JP | 2009-70754 A | 4/2009 |
| JP | 2010-244935 A | 10/2010 |

OTHER PUBLICATIONS

Notification of Reason(s) for Refusal dated Oct. 18, 2011, with English translation.

(Continued)

*Primary Examiner* — Renee S Luebke
*Assistant Examiner* — Larisa Tsukerman
(74) *Attorney, Agent, or Firm* — McGinn IP Law Group, PLLC

(57) ABSTRACT

A connector includes a first terminal housing for housing a plurality of first connecting terminals aligned, a second terminal housing for housing a plurality of second connecting terminals aligned, a plurality of insulating members that are aligned and housed in the first terminal housing, a connecting member for collectively fixing and electrically connecting the plurality of first connecting terminals and the plurality of second connecting terminals at each contact point by pressing one of the plurality of insulating members adjacent to the connecting member, and an insulating member assembly including the plurality of insulating members assembled such that the plurality of insulating members are each restricted from moving in a fitting direction thereof, and moving in a width direction perpendicular to a lamination direction of the laminated structure and to the fitting direction.

12 Claims, 5 Drawing Sheets

(56) References Cited

U.S. PATENT DOCUMENTS

| | | |
|---|---|---|
| 8,123,573 B2 * | 2/2012 | Takehara et al. ............... 439/845 |
| 8,272,887 B2 * | 9/2012 | Fukuda et al. ................. 439/372 |
| 8,272,891 B2 * | 9/2012 | Kataoka et al. ............ 439/540.1 |
| 2009/0075506 A1 | 3/2009 | Suzuki |
| 2012/0244755 A1 * | 9/2012 | Suzuki et al. ................. 439/660 |

OTHER PUBLICATIONS

European Search Report dated Dec. 3, 2012.
Notification of Reason(s) for Refusal dated Feb. 12, 2013, with English translation.

* cited by examiner

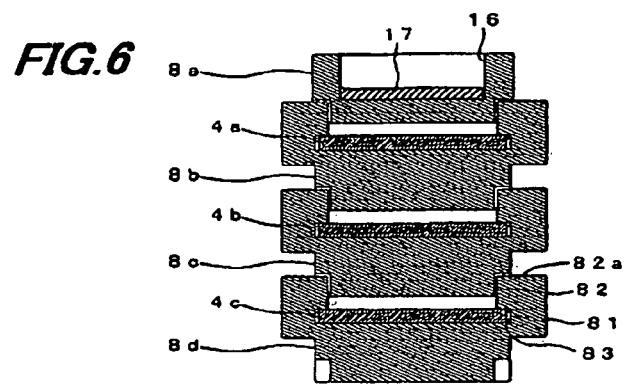
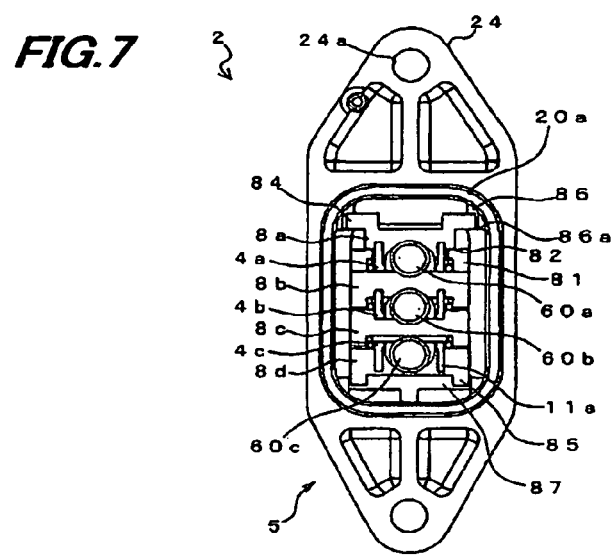

CONNECTOR

The present application is based on Japanese patent application No. 2010-284737 filed on Dec. 21, 2010, the entire contents of which are incorporated herein by reference.

BACKGROUND OF THE INVENTION

1. Field of the Invention

The invention relates to a connector used for, e.g., an eco-friendly car such as a hybrid car and an electric car and, in particular, to a connector that may be used for a power harness for transmitting a large amount of power.

2. Description of the Related Art

A power harness is used for connecting between devices such as between a motor and an inverter or between an inverter and a battery in, e.g., a hybrid car or an electric car, which has made significant progress in recent years, for transmitting a large amount of power, and a connector in a two-divided structure composed of, e.g., a male connector portion provided with a male terminal as well as a first terminal housing for housing the male terminal and a female connector portion provided with a female terminal connected to the male terminal as well as a second terminal housing for housing the female terminal is provided to one end of the power harness (see, e.g., JP-A-2009-070754).

In recent years, all components in such an eco-friendly car have been reduced in weight to improve the energy saving performance, and one effective measure for reducing the weight may be downsizing.

For example, Japanese patent No. 4037199 discloses a downsizing technique.

Japanese patent No. 4037199 discloses an electric connection structure for vehicle in which connecting terminals of plural phases of conductive member led out from a vehicle driving motor are connected to connecting terminals of plural phases of power line cable led out from an inverter for driving the motor, a connecting terminal of each phase of the conductive member overlaps a corresponding connecting terminal of each phase of the power line cable, an insulating member is arranged on a surface opposite to an overlapping surface of the connecting terminals, and the overlapped connecting terminals of each phase are tightened and fixed to the insulating members in an overlapping direction by a single bolt provided at a position to penetrate therethrough.

In other words, Japanese patent No. 4037199 discloses the connection structure that the plural connecting terminals and the insulating members compose a laminated structure and the connecting terminals are fixed and electrically connected all together at contact points by tightening the single bolt in the overlapping direction (or the lamination direction) while the plural contact points between the connecting terminals as the overlapping surface thereof are sandwiched. The connection structure may be more effective than the technique of JP-A-2009-070754 in facilitating the downsizing.

SUMMARY OF THE INVENTION

However, the technique such as disclosed in Japanese patent No. 4037199 has the following problems.

(1) There is a problem that the number of parts increases since a retaining jig for holding one end of each insulating member is provided as a separate member.

(2) Since the retaining jig for holding one end of each insulating member is a separate member, another problem arises that a connection portion between the retaining jig and the insulating member becomes large, so that the entire connection structure becomes large.

Thus, the inventors are convinced that the connector equipped with the laminated-type connection structure as in Japanese patent No. 4037199 needs further to be downsized. During their researches, a measure has been proposed that the insulating members are each fixed to one side of connecting terminals at the tip portion so as to omit the retaining jig.

However, the measure also has the following problem.

(1) In case of the connecting terminal fixed to the cable, a problem arises that when an excessive force (e.g., a force to pull the cable or a force to push the cable into a connector) is applied to the cable, the connecting terminal may move and cause the misalignment of the insulating member. The similar problem occurs in a bus bar type connecting terminal (such as a male terminal 4 in JP-A-2009-070754) used without fixing the cable. For example, if the connector is accidentally dropped, an excess force may be applied to the tip of the bus bar type connecting terminal which protrudes from the connector. In this case, the connecting terminal may move and cause the misalignment of the insulating member.

Accordingly, it is an object of the invention to provide a laminated structure type connector that can be downsized while preventing the misalignment of the insulating members.

(1) According to one embodiment of the invention, a connector comprises:

a first terminal housing for housing a plurality of first connecting terminals aligned;

a second terminal housing for housing a plurality of second connecting terminals aligned;

a plurality of insulating members that are aligned and housed in the first terminal housing;

a laminated structure that the first connecting terminals and the second connecting terminals are alternately arranged so that one surface of the plurality of first connecting terminals faces one surface of the plurality of second connecting terminals to form pairs and to form a plurality of contact points sandwiched between the plurality of insulating members when the first terminal housing is fitted to the second terminal housing;

a connecting member for collectively fixing and electrically connecting the plurality of first connecting terminals and the plurality of second connecting terminals at each contact point by pressing one of the plurality of insulating members adjacent to the connecting member; and an insulating member assembly comprising the plurality of insulating members assembled such that the plurality of insulating members are each restricted from moving in a fitting direction thereof, and moving in a width direction perpendicular to a lamination direction of the laminated structure and to the fitting direction.

In the above embodiment (1) of the invention, the following modifications and changes can be made.

(i) The plurality of insulating members comprise a plurality of first insulating members each provided on an other surface of the plurality of first connecting terminals, and a second insulating member arranged to face an other surface of an outermost one of the plurality of second connecting terminals when the plurality of first connecting terminals and the plurality of second connecting terminals are laminated, and the plurality of first insulating members are formed to have a looseness with the plurality of first connecting terminals.

(ii) One of the plurality of first insulating members comprises two connecting parts extending from both end portions thereof in a width direction thereof toward adjacent one of the plurality of first insulating members or the second insulating member to which the one of the plurality of first insulating members is opposite interposed by one of the plurality of first connecting terminals on which the one of the plurality of first insulating members is provided, and the plurality of first insulating members or the second insulating member comprises connecting grooves for receiving the connecting parts to be slidable in the lamination direction on both opposite sides thereof.

(iii) The connecting parts comprise a fitting groove formed at a proximal end thereof for being fitted to an end portion of the plurality of first connecting terminals in a width direction thereof to provide the plurality of first insulating members on the plurality of first connecting terminals.

(iv) The insulating member assembly comprises an engagement portion for being engaged with the first terminal housing at both ends thereof in the lamination direction.

(v) The first terminal housing comprises an assembly opening on an opposite side to a side for being fitted to the second terminal housing, and a resin molded body disposed such that after the insulating member assembly is inserted into and placed in the first terminal housing through the assembly opening, the resin molded body is inserted into and fitted to the first terminal housing through the assembly opening so as to sandwich the engagement portion between the first terminal housing and the resin molded body to fix the insulating member assembly to the first terminal housing.

(vi) The plurality of first connecting terminals comprise a terminal provided at an end portion of a cable, the resin molded body is formed to hold the cable, and the plurality of first connecting terminals are fixed to the first terminal housing via the cable and the resin molded body.

Points of the Invention

According to one embodiment of the invention, a connector is provided with an insulating member assembly assembled such that insulating members (which compose the insulating member assembly) are restricted from moving in a fitting direction and a width direction thereof (i.e., these directions being perpendicular to each other) by connecting the insulating members as engaged to each other. Accordingly, it is possible to prevent the position of the insulating members from being misaligned even when a force (e.g., a force to pull or push a cable connected with the connector) is applied to the cable. As a result, when two connector portions of the connector are fitted to each other, second connecting terminals (to be inserted between the insulating members) can be prevented from butting to the insulating members so as to smooth the fitting operation. Moreover, the connector can be downsized since the embodiment of the invention can omit the retaining jig unlike the conventional connector by using the insulating member assembly thus assembled.

BRIEF DESCRIPTION OF THE DRAWINGS

Next, the present invention will be explained in more detail in conjunction with appended drawings, wherein:

FIGS. 1A and 1B are diagrams illustrating a connector in an embodiment of the present invention, wherein FIG. 1A is a cross sectional view and FIG. 1B is a side view showing first connecting terminals and an insulating member assembly;

FIG. 6 is a cross sectional view taken on line A-A in FIG. 1B; and

FIG. 7 is a cross sectional view taken on line B-B in FIG. 3, which is seen through a resin molded body.

DETAILED DESCRIPTION OF THE PREFERRED EMBODIMENTS

A preferred embodiment of the invention will be described below in conjunction with the appended drawings.

Figure 1A:
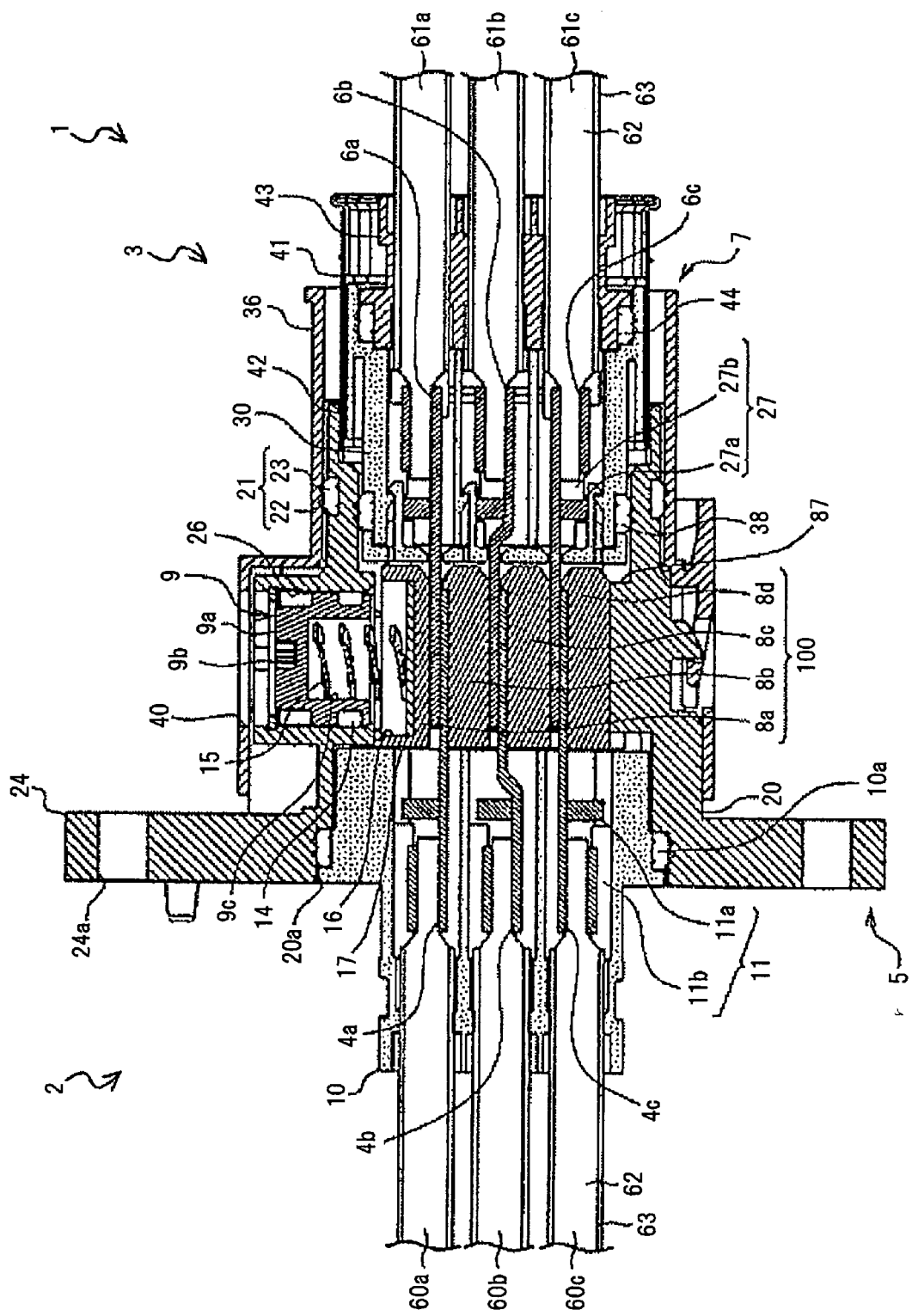
Figure 1B:
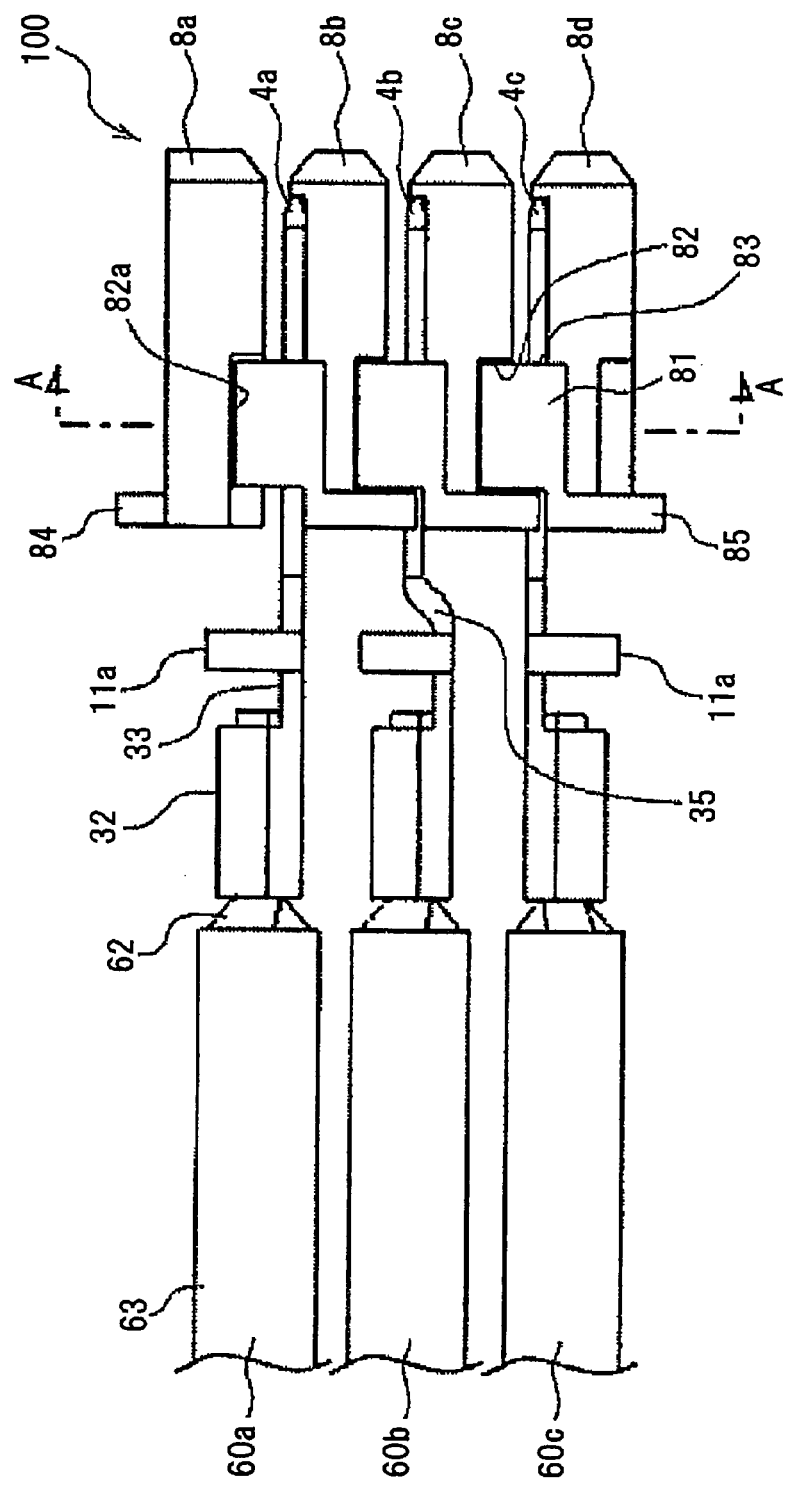
Figure 2A:
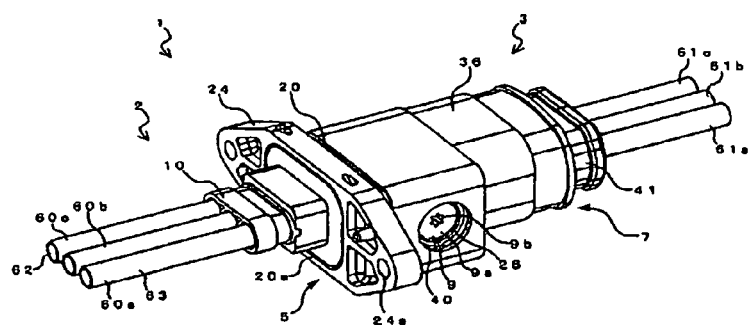
FIG. 2A is a perspective view showing the connector of FIG. 1
Figure 2B:
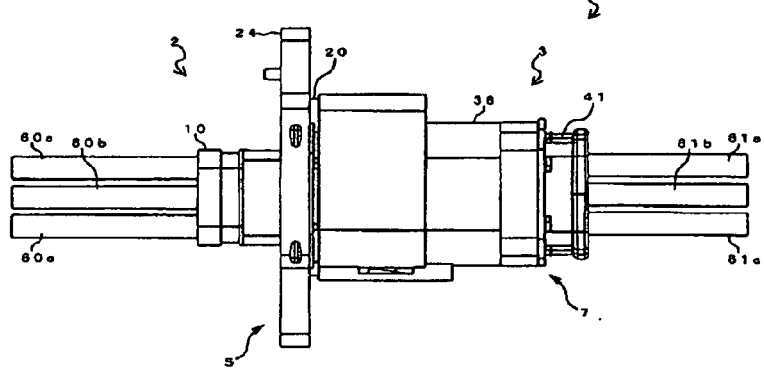
FIG. 2B is a plan view thereof.

FIGS. 1A, 1B, 2A and 2B are diagrams illustrating a connector in an embodiment, wherein FIG. 1A is a cross sectional view, FIG. 1B is a side view showing first connecting terminals and an insulating member assembly, FIG. 2A is a perspective view and FIG. 2B is a plan view.

As shown in FIGS. 1A, 1B, 2A and 2B, a connector 1 of the present embodiment is composed of a first connector portion 2 and a second connector portion 3, and plural power lines are connected at a time by fitting the connector portions 2 and 3 together.

More specifically, the connector 1 is provided with the first connector portion 2 having a first terminal housing (i.e., male terminal housing) 5 housing plural (three) aligned first connecting terminals (i.e., male terminals) 4a to 4c, the second connector portion 3 having a second terminal housing (i.e., female terminal housing) 7 housing plural (three) aligned second connecting terminals (i.e., female terminals) 6a to 6c, and plural (four) insulating members 8a to 8d aligned and housed in the first terminal housing 5 for insulating the first connecting terminals 4a to 4c each other, and is configured that, in the first connector portion 2 and the second connector portion 3 which are fitted to each other, the first connecting terminals 4a to 4c and the second connecting terminals 6a to 6c are alternately arranged to form laminated structure in which surfaces of the plural first connecting terminals 4a to 4c on one side face surfaces of the plural second connecting terminals 6a to 6c on one side to form respective pairs (a pair of the first connecting terminal 4a and the second connecting terminal 6a, that of the first connecting terminal 4b and the second connecting terminal 6b, and that the first connecting terminal 4c and the second connecting terminal 6c) and to form plural contact points, and each contact point is sandwiched by the insulating members 8a to 8d.

In the connector 1, cables 60a to 60c are connected to the first connector portion 2 and cables 61a to 61c are connected to the second connector portion 3, and the cables 60a to 60c are respectively electrically connected to the cables 61a to 61c by connecting the first connector portion 2 to the second connector portion 3. That is, the connector 1 is used to connect cables.

The connector 1 is used for connecting, e.g., a motor for driving a vehicle to an inverter for driving the motor. In the present embodiment, the cables 60a to 60c as cables extending from a motor and the cables 61a to 61c as cables extending from an inverter will be described as an example.

Each configuration of the connector portions 2 and 3 will be detailed below.

First Connector Portion

Firstly, the first connector portion 2 will be described below.

As shown in FIGS. 1A to 3, the first connector portion 2 holds, inside thereof, three first connecting terminals 4a to 4c aligned at predetermined intervals, and is provided with the first terminal housing 5 housing the three aligned first connecting terminals 4a to 4c, plural insulating members 8a to 8d in a substantially rectangular parallelepiped shape; which are provided in the first terminal housing 5 for insulating the first connecting terminals 4a to 4c from each other, and a connecting member 9 for collectively fixing and electrically connecting the plural first connecting terminals 4a to 4c to the plural second connecting terminals 6a to 6c at respective contact points by pressing the adjacent insulating member 8a.

The cables 60a to 60c extending from a motor are respectively connected to edges of the first connecting terminals 4a to 4c on one side. The cables 60a to 60c are each composed of a conductor 62 and an insulation layer 63 formed on the outer periphery thereof. The conductor 62 having a cross-sectional area of 20 mm$^2$ is used in the present embodiment.

Electricity of different voltage and/or current is transmitted to each of the cables 60a to 60c. For example, the present embodiment assumes the use of a three-phase AC power line between a motor and an inverter, and alternate current having a phase difference of 120° is transmitted to each of the cables 60a to 60c and the first connecting terminals 4a to 4c. Each of the first connecting terminals 4a to 4c should be formed of a highly conductive metal such as silver, copper or aluminum to reduce transmission loss, etc., in the connector 1. In addition, each of the first connecting terminals 4a to 4c has little flexibility.

The cables 60a to 60c are each aligned and held at predetermined intervals by a resin molded body (or inner housing) 10 which is in a multi-cylindrical shape (i.e., contiguous plural cylinders). The first connecting terminals 4a to 4c are fixed to the first terminal housing 5 via the cables 60a to 60c and the resin molded body 10.

The resin molded body 10 is formed of an insulating resin (e.g., PPS (polyphenylene sulfide) resin, PPA (polyphthalamide) resin, PA (polyamide) resin, PBT (polybutylene terephthalate) and epoxy-based resin), etc., to prevent short circuit by insulating the first connecting terminals 4a to 4c from each other. The resin molded body 10 allows the first connecting terminals 4a to 4c to be held at respective predetermined positions even when each of the cables 60a to 60c respectively connected to the first connecting terminals 4a to 4c is very flexible. In other words, since a cable excellent in flexibility can be used as the cables 60a to 60c in the present embodiment, it is possible to improve the wiring flexibility for laying the cables 60a to 60c.

The resin molded body 10 holds the cables 60a to 60c to position the first connecting terminals 4a to 4c, in more detail, the resin molded body 10 holds the end portion of the cables 60a to 60c at a position close to the first connecting terminals 4a to 4c so that the first connecting terminals 4a to 4c are held at predetermined positions, however, the resin molded body 10 may directly hold and position the first connecting terminals 4a to 4c while holding the cables 60a to 60c. Alternatively, a connecting terminal holding member for directly holding the first connecting terminals 4a to 4c without holding the cables 60a to 60c may be used in place of the resin molded body 10.

In a case that the resin molded body 10 determines the positions of the first connecting terminals 4a to 4c by holding the cables 60a to 60c without directly holding the first connecting terminals 4a to 4c, i.e., in the case as is the present embodiment, use of flexible cables 60a to 60c allows the tips of the first connecting terminals 4a to 4c to flexibly move with respect to the first terminal housing 5, and it is thereby possible to suppress deformation of the first connecting terminals 4a to 4c caused by pressure from the connecting member 9.

The first connector portion 2 is provided with a slip-off preventing mechanism 11 so that the cables 60a to 60c are not pulled out from the resin molded body 10 even when the cables 60a to 60c are pulled. The slip-off preventing mechanism 11 is composed of a protrusion 11a each formed at the proximal ends of the first connecting terminals 4a to 4c (in the vicinity of the cables 60a to 60c) and a locking projection 11b which is provided in each cylinder of the multi-cylindrical resin molded body 10 in a protruding manner to restrict backward movement (toward the left side in FIG. 1A) of the protrusion 11a by locking with the protrusion 11a.

As shown in FIG. 1B, each of the first connecting terminals 4a to 4c has a caulking portion 32 for caulking the conductor 62 which is exposed at end portions of the cables 60a to 60c and a plate-like contact point 33 integrally formed with the caulking portion 32. The protrusions 11a of the slip-off preventing mechanism 11 are formed to protrude upward (downward) from both widthwise end portions of the plate-like contact point 33 at the proximal end thereof.

Meanwhile, the present embodiment is configured such that the cables 60a to 60c are aligned and held with as little clearance as possible in order to downsize the connector 1. Therefore, a trunk portion 35 of the first connecting terminals 4b connected to the cable 60b which is arranged in the middle when aligned is bent so that the first connecting terminals 4a to 4c are arranged at equal intervals.

Among the plural insulating members 8a to 8d, the plural first insulating members 8b to 8d are aligned and housed in the first terminal housing 5 and are also provided integrally with the respective surfaces of the first connecting terminals 4a to 4c on another side (surfaces opposite to the surfaces connected to the second connecting terminals 6a to 6c), and a second insulating member 8a is provided so as to face the surface of the outermost second connecting terminal 6a (the uppermost side in FIGS. 1A and 1B) on another side (a surface opposite to the surface connected to the first connecting terminal 4a) when the plural first connecting terminals 4a to 4c and the plural second connecting terminals 6a to 6c form a laminated state.

The first insulating members 8b to 8d are provided on the first connecting terminals 4a to 4c at positions to protrude on the tip side. Each corner of the first insulating members 8b to 8d on a side to insert and extract the second connecting terminals 6a to 6c is chamfered. In addition, a corner of the second insulating member 8a on a side to insert and extract the second connecting terminals 6a to 6c and also on the first insulating member 8b side is also chamfered. Furthermore, a protruding portion (or a build-up surface) for filling level difference from the first connecting terminals 4a to 4c is each formed on the surfaces of the first insulating members 8b to 8d on which the first connecting terminals 4a to 4c are provided so that the upper surfaces (i.e., the upper side in the drawing) of the first insulating members 8b to 8d are respectively flush with the upper surfaces (i.e., the upper side in the drawing) of the first connecting terminals 4a to 4c. Due to this configuration, the tip portions of the first connecting terminals 4a to 4c do not contact with the tip portions of the second connecting terminals 6a to 6c to be inserted when the first connector portion 2 is fitted to the second connector portion 3, hence, an effect of improving insertability of the second connecting terminals 6a to 6c.

In the connector 1 of the present embodiment, an insulating member assembly 100 is formed by connecting the insulating members 8a to 8d each other to restrict movement thereof in a fitting direction (i.e., a horizontal direction in FIGS. 1A and 1B) and movement of the laminated structure in a width direction (i.e., a depth direction or front-back direction in FIGS. 1A and 1B) which is perpendicular to a lamination direction (i.e., a vertical direction in FIGS. 1A and 1B) and to the fitting direction. The detail of the insulating member assembly 100 will be described later.

The connecting member 9 has a head portion 9a in a substantially cylindrical shape, and the head portion 9a is turned and moved toward the second insulating member 8a by fitting a tool such as a wrench in an irregular shaped hole (i.e., a star-shaped hole in the embodiment) 9b formed on the upper surface (i.e., a surface opposite to the second insulating member 8a) of the head portion 9a to press the second insulating member 8a. A structure to turn and move the head portion 9a toward the second insulating member 8a is not specifically limited here, and for example, it may be configured such that two protrusions are formed so as to protrude outward in a diameter direction from the opposite positions on the side surfaces of the head portion 9a and are screwed together with a helical groove formed on the first terminal housing 5.

The connecting member 9 formed of, e.g., a metal such as SUS, iron and a copper alloy should be used. The connecting member 9 formed of resin may be used, however, it is preferable to use the connecting member 9 formed of metal from the viewpoint of strength. A packing 14 for preventing water from entering into the first terminal housing 5 is provided on the outer periphery of the head portion 9a.

In addition, an elastic member 15 for imparting a predetermined pressing force to the second insulating member 8a is provided between the lower surface of the head portion 9a of the connecting member 9 and the upper surface of the second insulating member 8a immediately thereunder. In the present embodiment, a concave portion 9c is formed on the lower surface of the head portion 9a to house the upper portion of the elastic member 15 therein. This is an idea to reduce a distance between head portion 9a and the second insulating member 8a and to downsize the connector 1 even when the elastic member 15 is long to some extent. The elastic member 15 is composed of, e.g., a spring formed of metal (e.g., SUS, etc.). The elastic member 15 is regarded as a portion of the connecting member 9 in the present embodiment.

A concave portion 16 for covering (housing) a lower portion of the elastic member 15 is formed on the upper surface of the second insulating member 8a with which the lower portion of the elastic member 15 is in contact, and a receiving member 17 formed of metal (e.g., SUS, etc.) for preventing the second insulating member 8a formed of an insulating resin from being damaged by receiving the elastic member 15 is provided on a bottom of the concave portion 16 (i.e., a seat portion with which the lower portion of the elastic member 15 is in contact).

The receiving member 17 prevents damage of the second insulating member 8a by dispersing stress applied from the elastic member 15 to the upper surface of the second insulating member 8a. Therefore, a contact area between the receiving member 17 and the second insulating member 8a is preferably as large as possible. The receiving member 17 having a shape in contact throughout the entire bottom surface of the bottom of the concave portion 16 is provided in the present embodiment in order to increase the contact area between the receiving member 17 and the second insulating member 8a.

The first terminal housing 5 is formed of a hollow cylindrical body 20 having a substantially rectangular shaped horizontal cross-section. An outer peripheral portion of one side (on the right side in FIG. 1A) of the cylindrical body 20 which is fitted to the second terminal housing 7 is formed in a tapered shape in light of fitting properties to the second connector portion 3. Meanwhile, a terminal housing waterproof structure 21 for sealing between the first connector portion 2 and the second connector portion 3 is provided on the outer peripheral portion of the one side of the cylindrical body 20. The terminal housing waterproof structure 21 is composed of a concave portion 22 formed on the outer peripheral portion of the one side of the cylindrical body 20 and a packing 23 such as an O-ring provided on the concave portion 22.

An assembly opening 20a which opens on one side of the cylindrical shape is formed inside the cylindrical body 20 on another side (on the left side in FIG. 1A), i.e., opposite to the side to be fitted to the second terminal housing 7, and the insulating member assembly 100 and the resin molded body 10 are inserted through the assembly opening 20a and then are fixed (details will be described later). At this time, only a portion of the resin molded body 10 on the tip side in an insertion direction is housed in the first terminal housing 5 and the remaining portion protrudes outward from the first terminal housing 5. A packing 10a for preventing water from entering into the first terminal housing 5 is provided on the outer periphery of the tip portion (a portion housed in the first terminal housing 5) of the resin molded body 10. In addition, a non-illustrated non-packing airtight portion is formed on the resin molded body 10 on a cable insertion side to prevent water from trickling down through the cables 60a to 60c and entering into the first terminal housing 5.

A flange 24 for fixing the first connector portion 2 to a vehicle body, etc., is formed on the outer periphery of the other side of the cylindrical body 20. The flange 24 has a mounting hole 24a through which a non-illustrated bolt is inserted for fixation to the vehicle body, etc. Although the flange 24 provided on the first connector portion 2 is described in the present embodiment, the flange 24 may be provided on the second connector portion 3 or on both the first connector portion 2 and the second connector portion 3. Alternatively, the flange 24 may be omitted.

Meanwhile, the flange 24 is effective to improve heat dissipation. That is, a surface area of the first terminal housing 5 can be increased by forming the flange 24, and it is thus possible to improve the heat dissipation when heat generated inside the first connector portion 2 (e.g., heat generated at each contact point) is released to the outside through the first terminal housing 5.

A connecting member insertion hole 26 for inserting the connecting member 9 therethrough is formed on the upper portion (on the upper side in FIG. 1A) of the cylindrical body 20. A portion of the first terminal housing 5 as a periphery of the connecting member insertion hole 26 is formed in a cylindrical shape (a hollow cylindrical shape).

For shielding performance, heat dissipation and weight saving of the connector 1, the cylindrical body 20 is preferably formed of light metal having high electrical and thermal conductivity such as aluminum, but may be formed of resin, etc. In the present embodiment, the cylindrical body 20 is formed of aluminum.

Second Connector Portion

The second connector portion 3 will be described below.

As shown in FIGS. 1A and 2B, the second connector portion 3 has the second terminal housing 7 in which plural (three) aligned second connecting terminals (female terminals) 6a to 6c are housed.

The cables 61a to 61c extending from the inverter side are respectively connected to edges of the second connecting terminals 6a to 6c on one side. The cables 61a to 61c are respectively electrically connected to the cables 60a to 60c via the first connecting terminals 4a to 4c and the second connecting terminals 6a to 6c, and electricity of different voltage and/or current corresponding to each of the cables 60a to 60c is transmitted. The cables 61a to 61c are the same cables as the cables 60a to 60c and are each composed of the conductor 62 and the insulation layer 63 formed on the outer periphery thereof. Although the same cables as the cables 60a to 60c are used as the cables 61a to 61c, cables having different sizes may be used.

The cables 61a to 61c are each aligned and held at predetermined intervals by a resin molded body (inner housing) 30 which is in a multi-cylindrical shape. The resin molded body 30 positions and holds the second connecting terminals 6a to 6c respectively on the first connecting terminals 4a to 4c (i.e., objects to be connected) which face the second connecting terminals 6a to 6c to be respectively paired therewith when the first connector portion 2 is fitted to the second connector portion 3.

The resin molded body 30 is formed of an insulating resin, etc., to prevent short circuit by insulating the second connecting terminals 6a to 6c from each other. The resin molded body 30 allows the second connecting terminals 6a to 6c to be held at respective predetermined positions even though each of the cables 61a to 61c respectively connected to the second connecting terminals 6a to 6c is very flexible.

Although the resin molded body 30 positions the second connecting terminals 6a to 6c by holding the cables 61a to 61c, it is not limited thereto. The resin molded body 30 may directly hold and position the second connecting terminals 6a to 6c while holding the cables 61a to 6k. Alternatively, a connecting terminal holding member for directly holding the second connecting terminals 6a to 6c without holding the cables 61a to 61c may be used.

In a case that the resin molded body 30 determines the positions of the second connecting terminals 6a to 6c by holding the cables 61a to 61c without directly holding the second connecting terminals 6a to 6c, i.e., in the case as is the present embodiment, use of flexible cables 61a to 61c allows the tips of the second connecting terminals 6a to 6c to flexibly move with respect to the second terminal housing 7, and it is thereby possible to suppress deformation of the second connecting terminals 6a to 6c caused by pressure from the connecting member 9.

A non-illustrated braided shield is wound around portions of the cables 61a to 6k which are pulled out from the second terminal housing 7, in order to improve the shielding performance. The braided shield is in contact with a below-described cylindrical shield body 41, and is electrically connected to the first terminal housing 5 via the cylindrical shield body 41 (the same potential (GND)).

Similarly to the first connector portion 2, the second connector portion 3 is provided with a slip-off preventing mechanism 27 so that the cables 61a to 61c are not pulled out from the resin molded body 30 even when the cables 61a to 61c are pulled. The slip-off preventing mechanism 27 is composed of a protrusion 27a each formed at the proximal ends of the second connecting terminals 6a to 6c (in the vicinity of the cables 61a to 61c) and a locking projection 27b which is provided in each cylinder of the multi-cylindrical resin molded body 30 in a protruding manner to restrict backward movement (toward the right side in FIG. 1A) of the protrusion 27a by locking with the protrusion 27a.

Figure 4A:
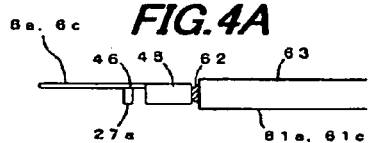
FIGS. 4A and 4B are diagrams illustrating a second connecting terminal of the connector of FIG. 1, wherein of FIG. 4A is a side view and of FIG. 4B is a top view.
Figure 4B:
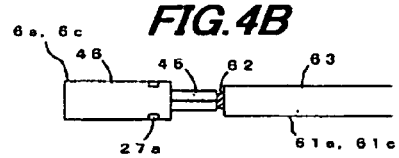
Figure 5A:
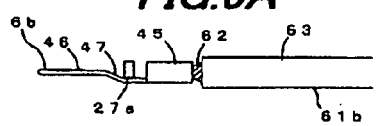
FIGS. 5A and 5B are diagrams illustrating a second connecting terminal of the connector of FIG. 1, wherein of FIG. 5A is a side view and of FIG. 5B is a top view.
Figure 5B:
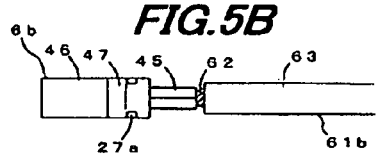

As shown in FIGS. 4 and 5, each of the second connecting terminals 6a to 6c has a caulking portion 45 for caulking the conductor 62 which is exposed at a tip portion of the cables 61a to 61c and a plate-like contact point 46 integrally formed with the caulking portion 45. In addition, a trunk portion 47 of the second connecting terminal 6b connected to the cable 61b which is arranged in the middle when aligned is bent so that the second connecting terminals 6a to 6c are arranged at equal intervals. The protrusion 27a of the slip-off preventing mechanism 27 is formed to protrude upward (downward) from both widthwise end portions of the plate-like contact point 46 at the proximal end thereof.

Each of the second connecting terminals 6a to 6c should be formed of a highly conductive metal such as silver, copper or aluminum to reduce transmission loss, etc., in the connector 1. In addition, each of the second connecting terminals 6a to 6c has little flexibility.

The second terminal housing 7 is composed of a hollow cylindrical body 36 having a substantially rectangular horizontal cross section. Since the first terminal housing 5 is fitted in the second terminal housing 7, an inner peripheral portion of the cylindrical body 36 on one side (on the left side in FIG. 1A) to be fitted to the first terminal housing 5 is formed in a tapered shape in light of fitting properties to the first terminal housing 5.

The resin molded body 30 aligning and holding the cables 61a to 61c is housed in the cylindrical body 36 on the other end side (on the right side in FIG. 1A). A non-packing airtight portion 43 is formed on the resin molded body 30 on a cable insertion side to prevent water from trickling down through the cables 61a to 61c and entering into the second terminal housing 7. A packing 44 in contact with the resin molded body 30 is provided on the outer periphery of the non-packing airtight portion 43.

A packing 38 in contact with an inner peripheral surface of the first terminal housing 5 is provided on the outer peripheral portion of the resin molded body 30. That is, the connector 1 has a double waterproof structure composed of the packing 23 of the terminal housing waterproof structure 21 and the packing 38 provided on the outer peripheral portion of the resin molded body 30.

Furthermore, the outer periphery of the cylindrical body 36 on the other end side from where the cables 61a to 61c are led out is covered by a rubber boot for preventing water from entering into the cylindrical body 36, even though it is not illustrated.

Meanwhile, a connecting member manipulating hole 40, through which the connecting member 9 provided on the first connector portion 2 is manipulated when the second connector portion 3 is fitted to the first connector portion 2, is formed on an upper portion of the cylindrical body 36 (on the upper side in FIG. 1A).

For shielding performance, heat dissipation and weight saving of the connector 1, the cylindrical body 36 is preferably formed of light metal having high electrical and thermal conductivity such as aluminum, but may be formed of resin, etc. Since the cylindrical body 36 is formed of an insulating resin in the present embodiment, the aluminum cylindrical shield body 41 is provided on an inner peripheral surface of the cylindrical body 36 on the other end side in order to improve the shielding performance and the heat dissipation.

The cylindrical shield body 41 has a contact portion 42 which comes in contact with an outer periphery of the aluminum first terminal housing 5 when the first connector portion 2 is fitted to the second connector portion 3, and the cylindrical shield body 41 and the first terminal housing 5 are thermally and electrically connected via the contact portion 42. This improves the shielding performance and the heat dissipation. Significant improvement is expected particularly in the heat dissipation by actively releasing heat to the first terminal housing 5 which is excellent in heat dissipation.

Connection between the First Connector Portion 2 and the Second Connector Portion 3

When the two terminal housings 5 and 7 are fitted to each other, the second connecting terminals 6a to 6c are respectively inserted into gaps between the respective pairs of the first connecting terminals 4a to 4c and the insulating members 8a to 8d. The insertion provides a laminated structure in which the surfaces of the plural first connecting terminals 4a to 4c on one side face the surfaces of the plural second connecting terminals 6a to 6c on one side to form the respective pair, and the first connecting terminals 4a to 4c, the second connecting terminals 6a to 6c and the insulating members 8a to 8d are alternately arranged, i.e., the insulating members 8a to 8d are arranged so as to sandwich the pairs of the first connecting terminals 4a to 4c and the second connecting terminals 6a to 6c.

At this time, in the first connector portion 2, since the first insulating members 8b to 8d are respectively provided on the tip side of the first connecting terminals 4a to 4c aligned and held at predetermined intervals, each gap between the insulating members 8b to 8d can be kept without additionally providing a retaining jig for keeping gaps between the respective insulating members 8b to 8d (see Japanese patent No. 4037199). This makes easy to insert the second connecting terminals 6a to 6c into the gaps between the respective pairs of the first connecting terminals 4a to 4c and the insulating members 8a to 8d. In other words, the insertion and extraction properties of the second connecting terminals 6a to 6c are not degraded. In addition, it is very effective in that it is possible to realize further downsizing as compared to the conventional art since it is not necessary to provide a retaining jig for keeping the gaps between the insulating members 8b to 8d.

Meanwhile, a contact point between the first connecting terminal 4a and the second connecting terminal 6a is sandwiched between the second insulating member 8a and the first insulating member 8b provided on the first connecting terminal 4a constituting a contact point. Likewise, a contact point between the first connecting terminal 4b (or 4c) and the second connecting terminal 6b (or 6c) is sandwiched between the first insulating member 8c (or 8d) provided on the first connecting terminal 4b (or 4c) constituting a contact point and the first insulating member 8b (or 8c) provided on the first connecting terminal 4a (or 4b) constituting another contact point.

When the head portion 9a of the connecting member 9 is turned by a tool such as wrench in this state and is pressed downward, the second insulating member 8a, the first insulating member 8b, the first insulating member 8c and the first insulating member 8d are pressed in this order by the elastic member 15, a pressing force is imparted to each contact point by any two of the insulating members 8a to 8d sandwiching and pressing each contact point, and each contact point comes in contact in a state of being insulated from each other. At this time, the first connecting terminals 4a to 4c and the second connecting terminals 6a to 6c are bent in some degree due to pressure from the insulating members 8a to 8d and respectively make contact in a large area. This makes strong contact and fixation of each contact point even under the environment in which vibration occurs, such as in a vehicle.

Insulating Member Assembly

The insulating member assembly 100 as an essential portion of the invention will be described below.

Figure 3:
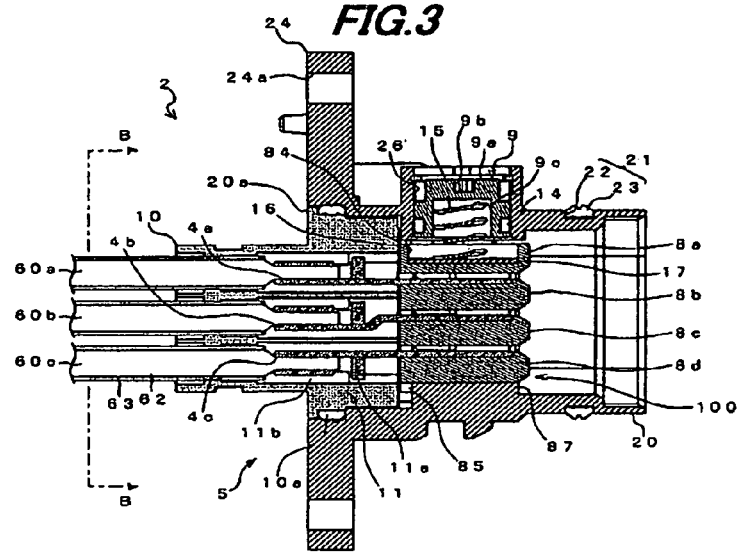
FIG. 3 is a cross sectional view showing a first connector portion of the connector of FIG. 1.

FIG. 6 is a cross sectional view taken on line A-A in FIG. 1B and FIG. 7 is a cross sectional view taken on line B-B in FIG. 3, which is seen through a resin molded body.

As shown in FIGS. 1B, 6 and 7, the insulating member assembly 100 is formed by sequentially connecting each of the insulating members 8a to 8d in the lamination direction. That is, the insulating member assembly 100 is formed by respectively connecting the second insulating member 8a to the first insulating member 8b, the first insulating member 8b to the first insulating member 8c, and the first insulating member 8c to the first insulating member 8d.

In the insulating member assembly 100, movement of the insulating members 8a to 8d in the fitting direction as well as in the width direction is restricted by connecting the insulating members 8a to 8d. In addition, in the insulating member assembly 100, the insulating members 8a to 8d are each connected to be relatively movable in the lamination direction in order to transmit a pressing force from the connecting member 9 to each contact point.

In detail, a connecting part 81 extending from both widthwise end portions of the first insulating members 8b to 8d toward the opposite insulating members 8a to 8c (toward the second insulating member 8a from the first insulating member 8b, the first insulating member 8b from the first insulating member 8c and the first insulating member 8c from the first insulating member 8d) with the first connecting terminals 4a to 4c interposed therebetween on which the first insulating members 8b to 8d are provided is each integrally provided on the first insulating members 8b to 8d.

In addition, a connecting groove 82 for receiving the connecting part 81 to be slidable in the lamination direction is each formed on the both side surfaces of the insulating members 8a to 8c opposite to the first insulating members 8b to 8d (facing with the first connecting terminals 4a to 4c interposed therebetween on which the first insulating members 8b to 8d are provided).

The insulating members 8a to 8d are each connected to be relatively movable in the lamination direction by respectively receiving the connecting part 81 of the first insulating member 8b in the connecting groove 82 of the second insulating member 8a, the connecting part 81 of the first insulating member 8c in the connecting groove 82 of the first insulating member 8b and the connecting part 81 of the first insulating member 8d in the connecting groove 82 of the first insulating member 8c, and the insulating member assembly 100 is thereby formed.

The connecting groove 82 is formed so that the width thereof in the fitting direction is substantially equal to that of the connecting part 81 to be received. This restricts the movement of the insulating members 8a to 8d in the fitting direction. Furthermore, the connecting parts 81 formed at the both widthwise end portions of the first insulating members 8b to 8d are received by the connecting grooves 82 formed on the both side surfaces of the opposite insulating members 8a to 8c, and thus, the opposite insulating members 8a to 8c are sandwiched by the connecting parts 81 in the width direction, which restricts the widthwise movement of the insulating members 8a to 8d.

In addition, in the insulating member assembly 100, when the insulating members 8a to 8d are connected (laminated), a tip (upper edge) of the connecting part 81 is restricted by a level difference 82a as an end edge of the connecting groove 82 so that gaps between the insulating members 8a to 8d are not smaller than a predetermined gap (the minimum laminating gap).

The minimum laminating gap is adjusted to be slightly smaller than each total thickness of the first connecting terminals 4a to 4c and the second connecting terminals 6a to 6c which compose contact points (contact point thickness). It is because, when the minimum laminating gap is larger than the contact point thickness, a pressing force from the connecting member 9 is not transmitted to the contact points, on the other hand, when the minimum laminating gap is too small, the insulating members 8a to 8d are largely misaligned in the lamination direction when the first connecting terminals 4a to 4c are deformed for some reasons and failure such as deterioration in fitting properties occurs. The minimum laminating gap can be adjusted by controlling a difference between a length of the connecting part 81 in the lamination direction and that of the connecting groove 82 (e.g., the minimum laminating gap is increased by making the connecting part 81 longer than the connecting groove 82).

The insulating members 8a to 8d are formed so that the that the widths thereof are substantially equal to those of the first connecting terminals 4a to 4c. A widthwise gap of the connecting parts 81 formed at the both widthwise end portions of the first insulating members 8b to 8d (a gap between inner surfaces) is formed to be slightly smaller than the widths of the first connecting terminals 4a to 4c, and a squared U-shaped fitting groove 83 for fitting the widthwise end portions of the first connecting terminals 4a to 4c is formed at the proximal end of each connecting part 81 in order to provide the first insulating members 8b to 8d on the first connecting terminals 4a to 4c. The first insulating members 8b to 8d are provided on the first connecting terminals 4a to 4c by fitting the first connecting terminals 4a to 4c to the fitting grooves 83.

By providing the first insulating members 8b to 8d on the first connecting terminals 4a to 4c, the first insulating members 8b to 8d are held by the first terminal housing 5 via the first connecting terminals 4a to 4c, the cables 60a to 60c and the resin molded body 10, and the positions of the first insulating members 8b to 8d with respect to the first terminal housing 5 are thereby determined. A gap is formed between the tip of the connecting part 81 and the level difference 82a as an end edge of the connecting groove 82 in the state that the first insulating members 8b to 8d are positioned with respect to the first terminal housing 5, and thus, the first insulating members 8b to 8d are respectively movable in the lamination direction.

The width of the fitting groove 83 in the lamination direction (a width of a squared U-shaped opening) is formed to be slightly larger than the thickness of the first connecting terminals 4a to 4c. As a result, a gap (clearance) is formed between the fitting grooves 83 and the first connecting terminals 4a to 4c when the first connecting terminals 4a to 4c are fitted to the fitting grooves 83 and the first insulating members 8b to 8d are thus provided having looseness (or play) with respect to the first connecting terminals 4a to 4c. Since the first insulating members 8b to 8d are provided having looseness (or play) with respect to the first connecting terminals 4a to 4c, the first insulating members 8b to 8d are flexibly movable even when the positions thereof are slightly misaligned, and deterioration in fitting properties caused by the second connecting terminals 6a to 6c butting to the first insulating members 8b to 8d, etc., can be prevented. In addition, it is possible to easily fit the first connecting terminals 4a to 4c to the fitting grooves 83 by forming a gap (clearance) between the fitting grooves 83 and the first connecting terminals 4a to 4c.

The connecting part 81 is formed to protrude outward in the width direction over the first insulating members 8b to 8d. This is to improve strength of the connecting part 81 by increasing the thickness thereof and to restrict widthwise movement of the insulating member assembly 100 by a contact of the outer surface of the connecting part 81 with the inner peripheral surface of the first terminal housing 5 (the cylindrical body 20). Therefore, a distance between the outer surfaces of the connecting part 81 formed at the both end portions of the first insulating members 8b to 8d is Mimed substantially equal to a gap between the inner peripheral surfaces of the first terminal housing 5.

In addition, engagement portions 84 and 85 for engaging the insulating member assembly 100 with the first terminal housing 5 are respectively formed at both end portions of the insulating member assembly 100 in the lamination direction, i.e., formed on the second insulating member 8a and the first insulating members 8d which are located outermost.

The engagement portion 84 is formed to extend upward (opposite to the first insulating member 8b) from the second insulating member 8a at a rear end portion in the fitting direction as well as at widthwise end portions, and to be bent at 90° above the second insulating member 8a so as to extend outward in the width direction. The engagement portion 84 is configured to be engaged with a partition wall 86 formed on the inner peripheral surface of the first terminal housing 5 and to determine the position of the insulating member assembly 100 in the fitting direction with respect to the first terminal housing 5 when the insulating member assembly 100 is inserted into the first terminal housing 5 (the cylindrical body 20) through the assembly opening 20a.

The partition wall 86 is formed along the lamination direction on the inner peripheral surface of the first terminal housing 5 on both sides (right and left surfaces in FIG. 7) at a position closer to the assembly opening 20a than to the connecting member insertion hole 26. In applying a pressing force by the connecting member 9, the engagement portion 84 moves along the partition wall 86 and the second insulating member 8a moves in the lamination direction. In addition, a level difference 86a is formed on the partition wall 86 so that the engagement portion 84 does not move beyond the level difference 86a (toward the first insulating member 8b side). That is, the engagement portion 84 has a function of determining the position of the insulating member assembly 100 in the fitting direction, a function of guiding the movement of the second insulating member 8a in the lamination direction and a function of restricting the movement of the second insulating member 8a in the lamination direction to the lower limit (the position closest to the first insulating member 8b).

On the other hand, the engagement portion 85 is formed to extend downward (opposite to the first insulating member 8c) from the first insulating member 8d at a rear end portion in the fitting direction as well as at widthwise end portions. The engagement portion 85 is configured to be engaged with a base 87 formed on the inner peripheral surface of the first terminal housing 5 and to determine, together with the engagement portion 84, the position of the insulating member assembly 100 in the fitting direction with respect to the first terminal housing 5 when the insulating member assembly 100 is inserted into the first terminal housing 5 (the cylindrical body 20) through the assembly opening 20a. Here, the base 87 has both a function of engaging the engagement portion 85 and a function of restricting downward movement (opposite to the first insulating member 8c) of the first insulating member 8d.

In addition, the engagement portion 85 is formed to protrude outward in the width direction over the first insulating member 8d and a distance between the outer surfaces thereof in the width direction is the same as a distance between the outer surfaces of the connecting part 81 in the width direction (i.e., the same width as the connecting part 81). Furthermore, the engagement portion 85 is configured to extend upward along the rear end portion of the first insulating member 8d in the fitting direction so as to be connected to the lower portion of the connecting part 81, and as a result, it is possible to increase an area in contact with the inner peripheral surface of the first terminal housing 5 (the cylindrical body 20) and to position the insulating member assembly 100 with respect to the first terminal housing 5 more stably. In addition, a surface of the upwardly extended portion of the engagement portion 85 on a front end side in the fitting direction is formed to be flush with an inner wall of the connecting groove 82 on a rear end side in the fitting direction, thereby serving to reinforce the connecting groove 82.

In the present embodiment, the engagement portion 85 is formed not only on the first insulating member 8d but also on the first insulating members 8b and 8c. Although the engagement portion 85 is fundamentally unnecessary for the first insulating members 8b and 8c and can be omitted, forming the engagement portion 85 on the first insulating members 8b and 8c allows the first insulating members 8b to 8d to have the same shape, thereby reducing the manufacturing cost. In addition, the first insulating member 8d has the connecting groove 82 which is fundamentally unnecessary for the same reason.

In the present embodiment, the connecting part 81 is formed on the first insulating members 8b to 8d and the connecting groove 82 is formed on the opposite insulating members 8a to 8c, however, the relation between the connecting part 81 and the connecting groove 82 can be obviously reversed (the connecting part 81 is formed on the insulating members 8a to 8c and the connecting groove 82 is formed on the opposite insulating members 8b to 8d in the insulating member assembly 100). In this case, however, since it is not possible to form the fitting groove 83 on the connecting part 81, a mechanism for providing the first connecting terminals 4a to 4c needs to be separately provided on the first insulating members 8b to 8d, which makes the structure of the first insulating members 8b to 8d complicated.

For assembling the first connector portion 2, the insulating member assembly 100 is inserted through the assembly opening 20a and is arranged in the first terminal housing 5 by respectively engaging the engagement portions 84 and 85 with the partition wall 86 and the base 87, and the resin molded body 10 is inserted through the assembly opening 20a and is fixed to the first terminal housing 5. Thus, the engagement portions 84 and 85 are sandwiched between and held by the first terminal housing 5 (the partition wall 86 and the base 87) and the resin molded body 10, thereby fixing the insulating member assembly 100 to the first terminal housing 5.

Effects of the Embodiment

The effects of the embodiment will be described below.

In the connector 1 of the present embodiment, the insulating member assembly 100 is configured such that the movement of the insulating members 8a to 8d in the fitting direction as well as in the width direction is restricted by connecting the insulating members 8a to 8d.

Accordingly, it is possible to prevent the positions of the insulating members 8a to 8d from being misaligned even when a force (e.g., a force to pull the cables 60a to 60c or a force to push the cables 60a to 60c into the first connector portion 2) is applied to the cables 60a to 60c, and as a result, it is possible to prevent the second connecting terminals 6a to 6c from butting to the insulating members 8a to 8d at the time of connecting the two connector portions 2 and 3 and a fitting operation can be smoothly carried out. In addition, the connector 1 is small since a retaining jig is not used, unlike the conventional connector.

Furthermore, in the connector 1, since the first insulating members 8b to 8d are provided having looseness with respect to the first connecting terminals 4a to 4c, the first insulating members 8b to 8d can be flexibly moved in accordance with the positions of the second connecting terminals 6a to 6c at the time of connecting the two connector portions 2 and 3 and it is thus possible to further improve the fitting properties.

In addition, in the connector 1, the connecting part 81 is formed to extend from the both widthwise end portions of the first insulating members 8b to 8d toward the opposite insulating members 8a to 8c with the first connecting terminals 4a to 4c interposed therebetween on which the first insulating members 8b to 8d are provided, and the connecting groove 82 receiving the connecting part 81 to be slidable in the lamination direction is formed on the both side surfaces of the opposite insulating members 8a to 8c.

This makes each of the insulating members 8a to 8d relatively movable in the lamination direction, which allows the pressing force from the connecting member 9 to be transmitted to each contact point. In addition, the fitting groove 83 to which the widthwise end portions of the first connecting terminals 4a to 4c are fitted to provide the first insulating members 8b to 8d on the first connecting terminals 4a to 4c can be formed at the proximal end of the connecting part 81, which allows the structure of the first insulating members 8b to 8d to be simplified.

Furthermore, the connector 1 is configured such that the engagement portions 84 and 85 for engaging the insulating member assembly 100 with the first terminal housing 5 are formed at the both end portions of the insulating member assembly 100 in the lamination direction and the insulating member assembly 100 is fixed to the first terminal housing 5 by sandwiching and holding the engagement portions 84 and 85 between the first terminal housing 5 and the resin molded body 10.

As a result, it is possible to easily position the insulating member assembly 100 with respect to the first terminal housing 5 and the misalignment of the entire insulating member assembly 100 (misalignment in the fitting direction) can be suppressed by firmly fixing the insulating member assembly 100 to the first terminal housing 5.

It should be noted that the present invention is not intended to be limited to the embodiment, and the various changes can be made without departing from the gist of the present invention.

For example, the present embodiment assumes the use of a three-phase AC power line, however, according to the technical idea of the invention, it may be, e.g., a connector for a vehicle which is configured to collectively connect lines used for different purposes such as a three-phase AC power line between a motor and an inverter and a two-phase DC power line for air conditioner. Since the configuration described above allows one connector to collectively connect power lines used for different purposes, it is not necessary to prepare different connectors for each intended purpose and it is thus possible to contribute to space saving and cost reduction.

Alternatively, terminal surfaces of the first connecting terminals 4a to 4c and the second connecting terminals 6a to 6c may be each roughened by a knurling process to increase frictional force so as to make the terminals difficult to move, thereby strengthening the fixation at each contact point.

Although the first connecting terminals 4a to 4c provided at the end portions of the cables 60a to 60c have been described in the present embodiment, it is not limited thereto. The first connecting terminals 4a to 4c may be a bus bar, etc., to which a cable is not connected.

In addition, although the case where the first insulating members 8b to 8d are provided on the first connecting terminals 4a to 4c by fitting the first connecting terminals 4a to 4c to the fitting groove 83 has been described in the present embodiment, the first insulating members 8b to 8d may be fixed to the first connecting terminals 4a to 4c by insert molding or by press-fitting the first connecting terminals 4a to 4c into the first insulating members 8b to 8d. In this regard, however, the first insulating members 8b to 8d do not have looseness with respect to the first connecting terminals 4a to 4c in the case of insert molding or press-fitting. Therefore, a structure in which the first connecting terminals 4a to 4c are fitted to the fitting groove 83 is desirable in light of improving the fitting properties.

In addition, although a cable excellent in flexibility is used as the cables 60a to 60c and 61a to 61c in the present embodiment, a rigid cable may be used.

In addition, in the present embodiment, a direction of the connecting member 9 may be either substantially horizontal or substantially vertical when the connector is in use. In other words, a direction in a usage state is not a requirement in the use conditions of the connector of the present embodiment.

In addition, although the head portion 9a of the connecting member 9 presses the second insulating member 8a adjacent thereto via the elastic member 15 which is a portion of the connecting member 9 in the present embodiment, the adjacent second insulating member 8a may be pressed directly by the head portion 9a, not via the elastic member 15.

Although the case of providing the connecting member 9 on only one side of the first terminal housing 5 has been described in the embodiment, the connecting member 9 may be provided on both sides of the first terminal housing 5 so that a pressing force is imparted to each contact point by the connecting members 9 provided on the both sides.

In addition, although the connecting member 9 is composed of only the head portion 9a in the embodiment, a through type connecting member in which a shaft penetrating through each contact point is integrally formed with the head portion 9a may be used.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A connector, comprising:
    a first terminal housing for housing a plurality of first connecting terminals aligned;
    a second terminal housing for housing a plurality of second connecting terminals aligned;
    a plurality of insulating members that are aligned and housed in the first terminal housing;
    a laminated structure that the first connecting terminals and the second connecting terminals are alternately arranged so that one surface of the plurality of first connecting terminals faces one surface of the plurality of second connecting terminals to form pairs and to form a plurality of contact points sandwiched between the plurality of insulating members when the first terminal housing is fitted to the second terminal housing;
    a connecting member for collectively fixing and electrically connecting the plurality of first connecting terminals and the plurality of second connecting terminals at each contact point by pressing one of the plurality of insulating members adjacent to the connecting member; and
    an insulating member assembly comprising the plurality of insulating members connected to each other and assembled such that the plurality of insulating members are each restricted from moving in a fitting direction thereof, and moving in a width direction perpendicular to a lamination direction of the laminated structure and to the fitting direction by the connection of the plurality of insulating members wherein one of a plurality of first insulating members comprises two connecting parts extending from both end portions thereof in a width direction thereof toward an adjacent one of the plurality of first insulating members or a second insulating member to which the one of the plurality of first insulating members is opposite interposed by one of a plurality of first connecting terminals on which the one of the plurality of first insulating members is provided, and wherein the plurality of first insulating members or the second insulating member comprises connecting grooves for receiving the connecting parts to be slidable in the lamination direction on both opposite sides thereof.

2. The connector according to claim 1, wherein the plurality of insulating members comprise a plurality of first insulating members each provided on an other surface of the plurality of first connecting terminals, and the second insulating member arranged to face an other surface of an outermost one of the plurality of second connecting terminals when the plurality of first connecting terminals and the plurality of second connecting terminals are laminated, and
    wherein the plurality of first insulating members are formed to have a looseness with the plurality of first connecting terminals.

3. The connector according to claim 2, wherein one of the plurality of first insulating members comprises two connecting parts extending from both end portions thereof in a width direction thereof toward an adjacent one of the plurality of first insulating members or the second insulating member to which the one of the plurality of first insulating members is opposite interposed by one of the plurality of first connecting terminals on which the one of the plurality of first insulating members is provided.

4. The connector according to claim 2, wherein the plurality of first insulating members or the second insulating member comprises connecting grooves for receiving connecting parts, extending in a width direction toward an adjacent one of the plurality of first insulating members or the second insulating member, to be slidable in the lamination direction on both opposite sides thereof.

5. The connector according to claim 1, wherein the insulating member assembly comprises an engagement portion for being engaged with the first terminal housing at both ends thereof in the lamination direction.

6. The connector according to claim 5, wherein the first terminal housing comprises an assembly opening on an opposite side to a side for being fitted to the second terminal housing, and
    wherein a resin molded body is disposed such that after the insulating member assembly is inserted into and placed in the first terminal housing through the assembly opening, the resin molded body is inserted into and fitted to the first terminal housing through the assembly opening so as to sandwich the engagement portion between the first terminal housing and the resin molded body to fix the insulating member assembly to the first terminal housing.

7. The connector according to claim 5, further comprising:
a resin molded body disposed such that after the insulating member assembly is inserted into and placed in the first terminal housing through an assembly opening, the resin molded body is inserted into and fitted to the first terminal housing through the assembly opening to sandwich the engagement portion between the first terminal housing and the resin molded body to fix the insulating member assembly to the first terminal housing.

8. The connector according to claim 1, further comprising:
a resin molded body disposed such that after the insulating member assembly is inserted into and placed in the first terminal housing through an assembly opening, the resin molded body is inserted into and fitted to the first terminal housing through the assembly opening to sandwich an engagement portion of the insulating member assembly between the first tem final housing and the resin molded body to fix the insulating member assembly to the first terminal housing.

9. A connector, comprising:
a first terminal housing for housing a plurality of first connecting terminals aligned;
a second terminal housing for housing a plurality of second connecting terminals aligned;
a plurality of insulating members that are aligned and housed in the first terminal housing;
a laminated structure that the first connecting terminals and the second connecting terminals are alternately arranged so that one surface of the plurality of first connecting terminals faces one surface of the plurality of second connecting terminals to form airs and to form a plurality of contact points sandwiched between the plurality of insulating members when the first terminal housing is fitted to the second terminal housing;
a connecting member for collectively fixing and electrically connecting the plurality of first connecting terminals and the plurality of second connecting terminals at each contact point by pressing one of the plurality insulating members adjacent to the connecting member; and
an insulating member assembly comprising the plurality of insulating members assembled such that the plurality of insulating members are each restricted from moving in a fitting direction thereof, and moving in a width direction perpendicular to a lamination direction of the laminated structure and to the fitting direction,
wherein the plurality of insulating members comprise a plurality of first insulating members each provided on an other surface of the plurality of first connecting terminals, and a second insulating member arranged to face an other surface of an outermost one of the plurality of second connecting terminals when the plurality of first connecting terminals and the plurality of second connecting terminals are laminated,
wherein the plurality of first insulating members are formed to have a looseness with the plurality of first connecting terminals,
wherein one of the plurality of first insulating members comprises two connecting parts extending from both end portions thereof in a width direction thereof toward adjacent one of the plurality of first insulating members or the second insulating member to which the one of the plurality of first insulating members is opposite interposed by one of the plurality of first connecting terminals on which the one of the plurality of first insulating members is provided, and
wherein the plurality of first insulating members or the second insulating member comprises connecting grooves for receiving the connecting parts to be slidable in the lamination direction on both opposite sides thereof.

10. The connector according to claim 9, wherein the connecting parts comprise a fitting groove formed at a proximal end thereof for being fitted to an end portion of the plurality of first connecting terminals in a width direction thereof to provide the plurality of first insulating members on the plurality of first connecting terminals.

11. A connector, comprising:
a first terminal housing for housing a plurality of first connecting terminals aligned;
a second terminal housing for housing a plurality of second connecting terminals aligned;
a plurality of insulating members that are aligned and housed in the first terminal housing;
a laminated structure that the first connecting terminals and the second connecting terminals are alternately arranged so that one surface of the plurality of first connecting terminals faces one surface of the plurality of second connecting terminals to form pairs and to form a plurality of contact points sandwiched between the plurality of insulating members when the first terminal housing is fitted to the second terminal housing;
a connecting member for collectively fixing and electrically connecting the plurality of first connecting terminals and the plurality of second connecting terminals at each contact point by pressing one of the plurality of insulating members adjacent to the connecting member; and
an insulating member assembly comprising the plurality of insulating members assembled such that the plurality of insulating members are each restricted from moving in a fitting direction thereof, and moving in a width direction perpendicular to a lamination direction of the laminated structure and to the fitting direction,
wherein the insulating member assembly comprises an engagement portion for being engaged with the first terminal housing at both ends thereof in the lamination direction,
wherein the first terminal housing comprises an assembly opening on an opposite side to a side for being fitted to the second terminal housing, and
wherein a resin molded body is disposed such that after the insulating member assembly is inserted into and placed in the first terminal housing through the assembly opening, the resin molded body is inserted into and fitted to the first terminal housing through the assembly opening so as to sandwich the engagement portion between the first terminal housing and the resin molded body to fix the insulating member assembly to the first terminal housing.

12. The connector according to claim 11, wherein the plurality of first connecting terminals comprise a terminal provided at an end portion of a cable,
wherein the resin molded body is formed to hold the cable, and
wherein the plurality of first connecting terminals are fixed to the first terminal housing via the cable and the resin molded body.

* * * * *